(12) United States Patent
Hatori (10) Patent No.: US 11,304,163 B2
(45) Date of Patent: Apr. 12, 2022

(54) WIRELESS COMMUNICATION APPARATUS AND WIRELESS COMMUNICATION SYSTEM

(71) Applicants: Kabushiki Kaisha Toshiba, Tokyo (JP); Toshiba Electronic Devices & Storage Corporation, Tokyo (JP)

(72) Inventor: Fumitoshi Hatori, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/003,043

(22) Filed: Aug. 26, 2020

(65) Prior Publication Data

US 2021/0297974 A1 Sep. 23, 2021

(30) Foreign Application Priority Data

Mar. 19, 2020 (JP) .............................. JP2020-049742

(51) Int. Cl.
*H04W 56/00* (2009.01)

(52) U.S. Cl.
CPC ..... *H04W 56/003* (2013.01); *H04W 56/0065* (2013.01)

(58) Field of Classification Search
CPC ........................ H04W 56/003; H04W 56/0065
See application file for complete search history.

(56) References Cited

U.S. PATENT DOCUMENTS

| 6,771,629 | B1* | 8/2004 | Preston ................ H04B 7/2662 370/337 |
| 7,142,880 | B2 | 11/2006 | Schmandt et al. |
| 7,796,555 | B2 | 9/2010 | Jeon et al. |
| 7,801,082 | B2 | 9/2010 | Jeon et al. |
| 8,031,737 | B2 | 10/2011 | Jeon et al. |

(Continued)

FOREIGN PATENT DOCUMENTS

| JP | 3836075 B2 | 10/2006 |
| JP | 4825915 B2 | 11/2011 |
| JP | 6582372 B2 | 10/2019 |

*Primary Examiner* — Stephen J Clawson
(74) *Attorney, Agent, or Firm* — Allen & Overy LLP (57) ABSTRACT

A wireless communication apparatus includes a transmission/reception unit, a measurement unit, a physical layer, an acquisition unit, and a control unit. The transmission/reception unit transmits/receives packets to/from a communication peer. The measurement unit starts measuring a time period after a predetermined time from an end of the packet transmitted to the communication peer. The physical layer detects a synchronization code included in the packet transmitted from the communication peer and generates a synchronization detection signal. The acquisition unit acquires a measured value by the measurement unit when receiving the synchronization detection signal. The control unit has a function to change the physical layer to a physical layer with a different error tolerance, and calculates a propagation delay by subtracting a length of a synchronization code from the measured value and judges whether to update the physical layer or not depending on the propagation delay.

6 Claims, 5 Drawing Sheets

(56) References Cited

U.S. PATENT DOCUMENTS

| | | |
|---|---|---|
| 8,228,874 B1 | 7/2012 | Jeon et al. |
| 8,228,955 B2* | 7/2012 | Tamaki .............. H04W 56/003 |
| | | 370/508 |
| 8,238,308 B2 | 8/2012 | Jeon et al. |
| 8,442,066 B2 | 5/2013 | Jeon et al. |
| 9,628,309 B1* | 4/2017 | Luong .............. H04L 25/03057 |
| RE46,509 E | 8/2017 | Jeon et al. |
| RE46,575 E | 10/2017 | Jeon et al. |
| 2003/0185186 A1* | 10/2003 | Tsutsumi .......... H04W 72/1242 |
| | | 370/338 |
| 2004/0042396 A1* | 3/2004 | Brown .................. H04L 29/06 |
| | | 370/227 |
| 2004/0086034 A1* | 5/2004 | Jungerman ............ H04L 1/203 |
| | | 375/224 |
| 2013/0132782 A1* | 5/2013 | Wiran .................. G06F 11/076 |
| | | 714/47.2 |

* cited by examiner

| PHYSICAL LAYER | ERROR TOLERANCE | DATA RATE |
|---|---|---|
| LE2M | WEAK | 2Mbps |
| LE1M | NORMAL | 1Mbps |
| Coded, S=2 | RATHER STRONG | 500kbps |
| Coded, S=8 | STRONG | 125kbps |

WIRELESS COMMUNICATION APPARATUS AND WIRELESS COMMUNICATION SYSTEM

CROSS REFERENCE TO RELATED APPLICATION

This application is based upon and claims the benefit of priority from the prior Japanese Patent Application No. 2020-049742 filed on Mar. 19, 2020; the entire contents of which are incorporated herein by reference.

FIELD

Embodiments described herein relate generally to a wireless communication apparatus and a wireless communication system.

BACKGROUND

In recent years, communication devices conforming to Bluetooth Low Energy (BLE) specification of the Bluetooth (registered trademark) standard, which is a short range wireless communication, have been actively developed. In the BLE standard, a plurality of physical layers are defined, and the physical layers can be selected depending on a use case scenario or the situation of the device. The communication devices can optimize the communication considering a tradeoff between a data rate and the power consumption. For example, if a distance from a peer device (hereinafter referred to as a communication distance) is short, the device selects a physical layer by emphasizing the data rate rather than the error tolerance. On the other hand, if the communication distance is long, it selects a physical layer by emphasizing the error tolerance rather than the data rate.

DETAILED DESCRIPTION

A wireless communication apparatus according to an embodiment includes a transmission/reception unit, a measurement unit, a physical layer, an acquisition unit, and a control unit. The transmission/reception unit transmits and receives packets to and from a communication peer. The measurement unit starts to measure a time period after a predetermined time from the end of the last packet transmitted to the communication peer. The physical layer detects a synchronization code included in the packet transmitted from the communication peer and generates a synchronization detection signal. The acquisition unit acquires a value measured by the measurement unit when receiving the synchronization detection signal. The control unit has a function to select the physical layer among physical layers defined in the Bluetooth standards, and calculates a propagation delay by subtracting the length of the synchronization code from the measured value and judges whether to change the physical layer or not depending on the calculated propagation delay.

Embodiments will be described in detail below with reference to the drawings.

First Embodiment

Figure 1:
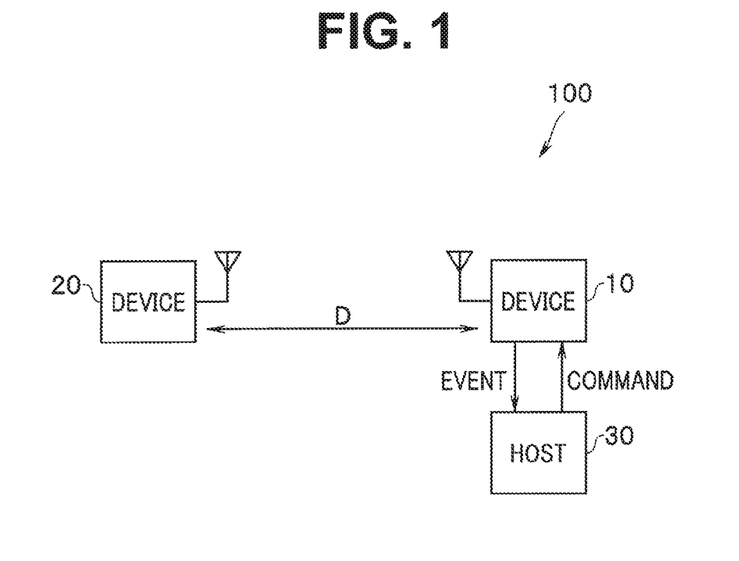
FIG. 1 is a block diagram illustrating a configuration of a wireless communication system including a wireless communication apparatus according to the first embodiment.
Figure 2:
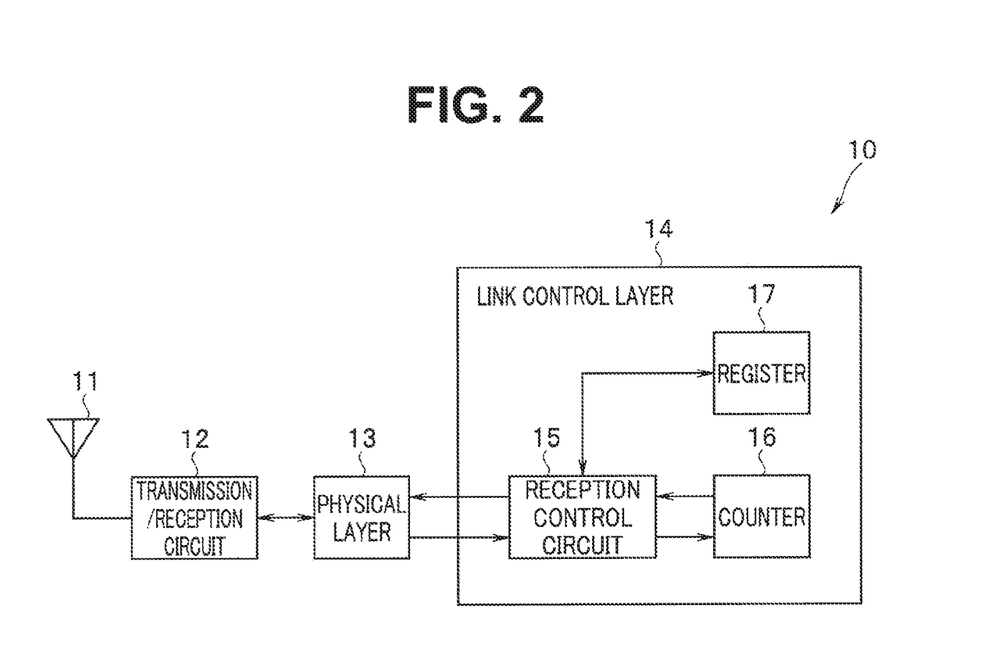
FIG. 2 is a block diagram illustrating a configuration of the wireless communication apparatus according to the present embodiment.

FIG. 1 is a block diagram illustrating a configuration of a wireless communication system including a wireless communication apparatus according to the first embodiment. FIG. 2 is a block diagram illustrating a configuration of the wireless communication apparatus according to the first embodiment.

A wireless communication system 100 is configured to include devices 10 and 20 and a host 30. The devices 10 and 20 are placed away from each other by a distance D. At least one of the devices 10 and 20 is mobile, and the distance D changes as the device moves.

The device 10 constituting the wireless communication apparatus includes an antenna 11, a transmission/reception circuit 12, a physical layer 13, and a link control layer 14. The link control layer 14 includes a reception control circuit 15, a counter 16, and a register 17. The counter 16 constitutes a measurement unit. Note that the device 20 has a similar configuration to a configuration of the device 10.

In the BLE standard, when connection is established between the two devices, a data communication period is set at a predetermined interval. During a data communication period, packets are alternately exchanged between the master device 10 and the slave device 20.

More specifically, the transmission/reception circuit 12 converts a packet of a digital signal transferred from the physical layer 13 into a packet of an analog signal, and transmits the packet of the analog signal to a communication peer via the antenna 11. The transmission/reception circuit 12 converts the packet of the analog signal transmitted from the communication peer and received via the antenna 11 into a packet of a digital signal, and outputs the packet of the digital signal to the physical layer 13. Thus, the transmission/reception circuit 12 constitutes a transmission/reception unit configured to transmit and receive a packet to and from the communication peer.

It is defined in the BLE standard that each of the devices 10 and 20 transmits, when receiving a packet from the communication peer, a packet to the communication peer after a predetermined time period from the end of the received packet. The predetermined time period is referred to as the inter-frame space (IFS), and a value of the time period T_IFS is defined to be in the range of 150±2 us.

The BLE standard is initially designed to be used in short range communication within approximately 100 m. Then, in version 5.0 of the BLE standard, physical layers using error correction techniques are introduced to achieve longer communication distance. As a result, the potential communication distance reaches the order of 1 km. In that case, there could occur a situation where a propagation delay $\Delta t$ of a radio wave increases and becomes non-negligible compared to the tolerance of T_IFS. The propagation delay Δt of the radio wave is defined as a time period during which the radio wave propagates over the round-trip distance between the devices 10 and 20. Accordingly, the larger the distance D between the devices 10 and 20 becomes, the larger the propagation delay Δt of the radio wave becomes. When the communication distance is large, if an update of the physical layer 13 to the one with a lower error tolerance than the current physical layer is performed, a quality of a received signal could become worse than the capability of an error correction, and a reception cannot be normally performed and the connection may be lost.

In the present embodiment, it is judged whether to update the physical layer 13 or not based on the information about the propagation delay Δt measured by the link control layer 14.

Figure 3:
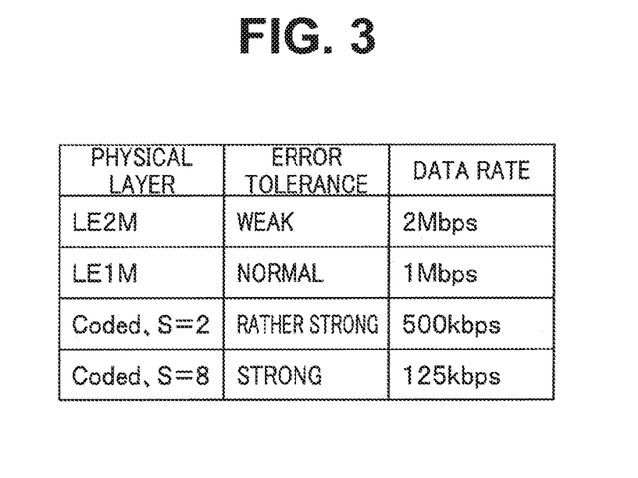
FIG. 3 is a table showing the types of physical layers defined in the BLE standard.

In this paragraph, a physical layer in BLE will be described. When a connection is established, any one of four types of physical layers defined in a BLE standard is selected. FIG. 3 is a table showing the types of the physical layers defined in the standard. In the standard, as the physical layer 13, four types of the physical layers "LE2M", "LE1M", "Coded, S=2", and "Coded, S=8" are defined, and are separately used depending on the use case scenario of the situation of the device 10. For example, "LE2M" has the lowest error tolerance but the highest data rate of 2 Mbps.

A policy for managing communication is implemented on the device 10. For example, the policy manages communication by selecting a physical layer with higher data rate when data to be transmitted increases rapidly and a required data rate exceeds a certain value. On the other hand, the policy manages the communication by selecting a physical layer with larger error tolerance when the retransmission of the data exceeds a certain value because of the deterioration of the communication environment.

During communication with the device 20 using a certain physical layer 13, the device 10 updates the physical layer 13 at an event that an index parameter (e.g., a required data rate or a frequency of retransmission) being monitored by the policy has exceeds a certain threshold value. The device 10 communicates with the device 20 by the updated physical layer 13 until a next event requiring an update of the physical layer 13 occurs.

When the policy is implemented on the device 10, the device 10 autonomously updates the physical layer 13. The policy may be implemented on the host 30. In this case, the host 30 issues a command to the device 10 to request an update of the physical layer 13, and the device 10 updates the physical layer 13 according to the request command.

In the present embodiment, when the event of updating the physical layer 13 has occurred, and particularly when an event of updating to the physical layer 13 with a lower error tolerance than the current physical layer 13 has occurred, it is judged whether to update the physical layer 13 or not depending on a result of the comparison between a measured propagation delay Δt and its reference value, as described below.

Two methods are defined as a method to update the physical layer 13. The first method is a method for the device 10 to autonomously update the physical layer 13. The second method is a method for the device 10 to update the physical layer 13 according to the request command from the host 30. In the present embodiment, the method for the device 10 to autonomously update the physical layer 13 will be described.

Figure 4:
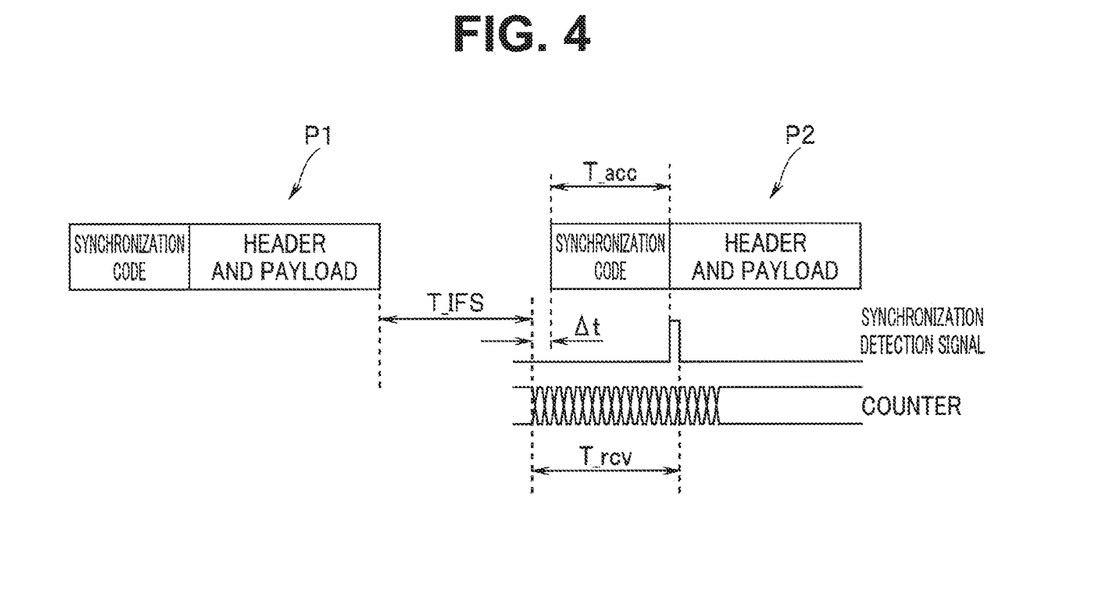
FIG. 4 is a diagram illustrating an example of a measurement principle of a propagation delay.

In the present embodiment, information about a communication distance is indirectly acquired from a value of a propagation delay Δt of a packet measured within a device when a physical layer is updated. First, a specific method of measuring the propagation delay Δt will be described below. FIG. 4 is a diagram illustrating an example of a measurement principle of a propagation delay in the device 10.

The device 10 transmits a packet P1 to the device 20, and then receives a packet P2 transmitted by the device 20. When the device 10 receives the packet P2, the physical layer 13 detects a synchronization code (Access Address) existing at the beginning of the packet P2, and generates a synchronization detection signal More precisely, the physical layer 13 generates a synchronization detection pulse signal immediately after the detection of the entire synchronization code. The synchronization detection signal is transferred to the reception control circuit 15.

The reception control circuit 15 measures a timing of the synchronization detection signal using the counter 16, and stores a measurement result in the register 17. The register 17 can be accessed from both the hardware and the software constituting the link control layer 14.

More specifically, the reception control circuit 15 controls the counter 16, initializes the counter 16 to zero and starts the counter 16 at the time point when T_IFS has elapsed from the end of the packet P1 transmitted by the device 10 itself. The reception control circuit 15 stores the current value of the counter 16 in the register 17 when receiving the synchronization detection signal.

T_rcv is the measured time by the counter 16 from the end of the IFS period to the instance of the synchronization detection and composed of the propagation delay Δt and the length of Access Address (T_acc) assuming that other delay factors such as the processing delay in the physical layer 13 are negligible. Under the assumption, the propagation delay Δt can be calculated as T_rcv−T_acc and by multiplying the calculated propagation delay Δt by the speed of a radio wave (=the light speed, approximately $3 \times 10^8$ [m/s]), the round-trip distance between the devices 10 and 20 can be estimated. The distance D between the devices 10 and 20 can be obtained by dividing the round-trip distance by 2. If the information of the other delay factors in the physical layer 13 is preliminary available, more precise propagation delay can be obtained by taking the factors into account.

Besides the control of the transmission and the reception of packets, the link control layer 14 has a function to autonomously update the physical layer 13 regardless of an instruction from the host 30. The link control layer 14 judges whether to update the physical layer 13 or not considering the information about the propagation delay Δt acquired by transmitting a packet (P1) and receiving a packet (P2).

More specifically, the link control layer 14 judges whether to update the physical layer 13 or not depending on a result of the comparison between the propagation delay Δt and a predefined reference value. The predefined reference value is defined within the link control layer 14 in advance.

In the present embodiment, the distance D between the devices 10 and 20 is assumed to be approximately 1 km, for example, and as a result the round-trip distance is assumed to be about 2 km. By using the fact that the speed of the radio wave (=the light speed) is approximately $3 \times 10$ [m/s], the propagation delay Δt is obtained by calculating $2 \times 10^3$ [m]/$(3 \times 10^8$ [m/s]), and that results in $\Delta t = 2/3 \times 10^{-5}$ [s]$\approx 6.67 \times 10^{-6}$ [s].

Accordingly, if the round-trip distance is assumed to be 2 km, the propagation delay Δt is approximately 6.67 [μs]. In the present embodiment, the reference value is set to a value between 6 and 7 [μs] to judge whether or not the round-trip distance is more than 2 km. Note that the reference value may be set to another value if the information about the processing delay in the physical layer 13 is available.

For example, if communication is performed using the physical layer 13 of "Coded, S=2", and the propagation delay Δt is more than the reference value, the link control layer 14 controls the physical layer 13 not to use the physical layer 13 of "LE1M" or "LE2M" which has a lower error tolerance than the current physical layer "Coded, S=2".

In other words, if the propagation delay Δt is more than the reference value, the devices 10 and 20 are considered to be away from each other, and an error occurrence frequency at the time of receiving the packet P2 is estimated to be high. Accordingly, if an update of the physical layer 13 with a lower error tolerance than the current physical layer is performed, connection between the devices 10 and 20 may be lost. The link control layer 14 performs control to prohibit the update to the physical layer 13 with a lower error tolerance than the current physical layer if the propagation delay Δt is larger than the reference value. As a result, the connection between the devices 10 and 20 can be prevented from being lost in advance.

Figure 5:
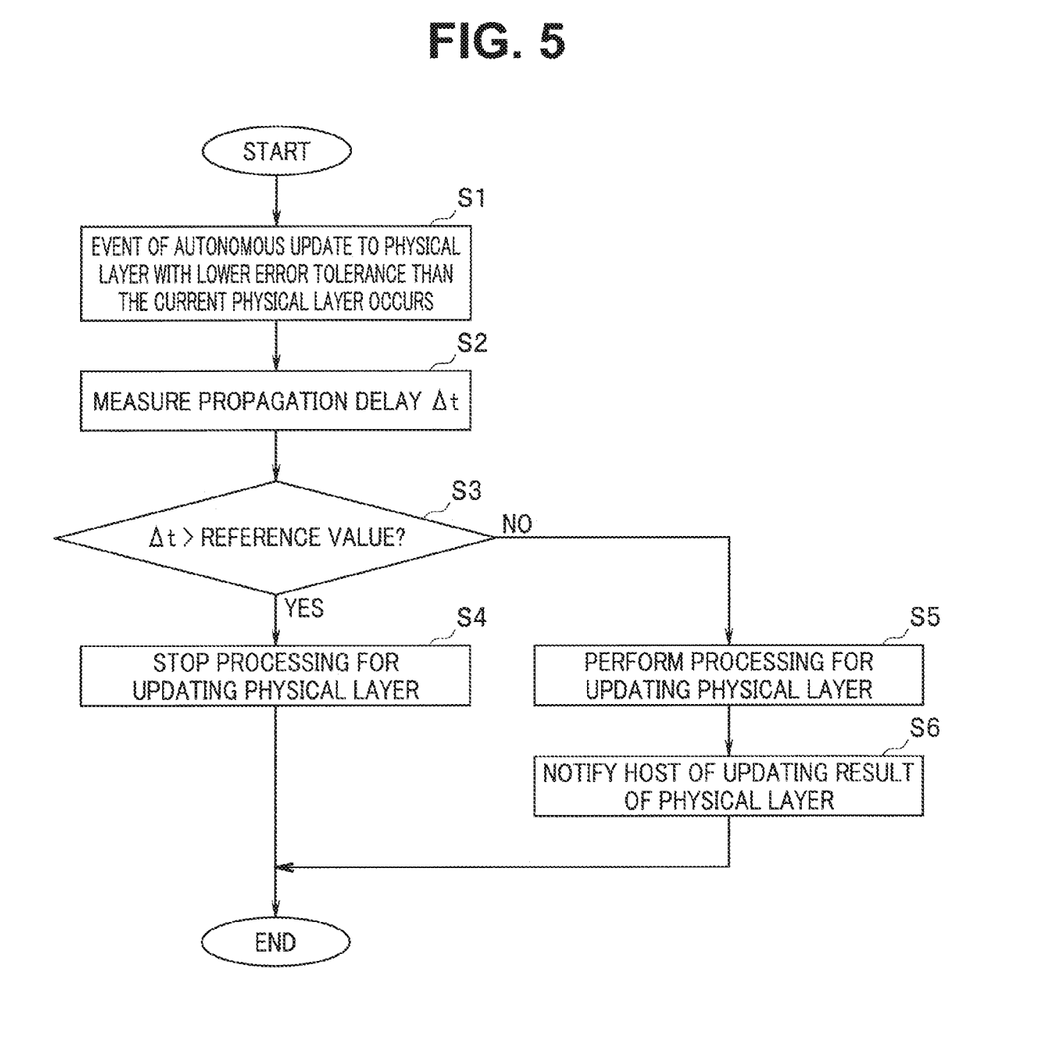
FIG. 5 is a flowchart describing processing for updating a physical layer when an autonomous updating has occurred within a device.

FIG. 5 is a flowchart to describe the processing for updating a physical layer when an event of autonomous updating has occurred within a device. When an event of autonomous updating to the physical layer 13 with a lower error tolerance than the current physical layer occurs (S1), the link control layer 14 measures a propagation delay Δt (S2). The propagation delay Δt is calculated by subtracting a length T_acc of a synchronization code from a time period T_rcv measured as the period between the end of the IFS and the instance of synchronization detection.

Then, the link control layer 14 judges whether the propagation delay Δt is larger than a reference value (S3) or not. If the link control layer 14 judges that the propagation delay Δt is larger than the reference value (S3: YES), the link control layer 14 stops updating the physical layer 13 (S4), and terminates the processing. In other words, the link control layer 14 judges that the distance from the device 20 as a communication peer is too large and a risk that the connection is lost by updating the physical layer 13 is high, and does not perform the processing for updating the physical layer 13.

On the other hand, if the link control layer 14 judges that the propagation delay Δt is less or equal to the reference value (S3: NO), the link control layer 14 performs the processing for updating the physical layer 13 (S5). In other words, the link control layer 14 judges that the distance from the device 20 as a communication peer is short enough and the risk that connection is lost is low, and updates the physical layer 13. Finally, the link control layer 14 notifies the host 30 of a result of updating the physical layer 13 (S6), and terminates the processing.

From the foregoing processing, when the communication distance is large, i.e., when the propagation delay Δt is larger than the reference value, the update to the physical layer 13 with a lower error tolerance than the current physical layer is not performed. Thus, a good communication quality can be held. Accordingly, in the wireless communication apparatus according to the present embodiment, even if the communication distance is large, the physical layer is appropriately selected so that the connection cannot be lost or cannot be easily lost.

Second Embodiment in a BLE standard, it is defined that a request to select a physical layer 13 within a device 10 can be issued from a host 30. In second embodiment, a case where the physical layer 13 is updated by the request from the host 30 will be described.

In the present embodiment, a request to update the physical layer 13 is issued from the host 30 to link control layer 14. When the link control layer 14 receives the request, the link control layer 14 judges whether to update the physical layer 13 or not considering the propagation delay Δt.

Figure 6:
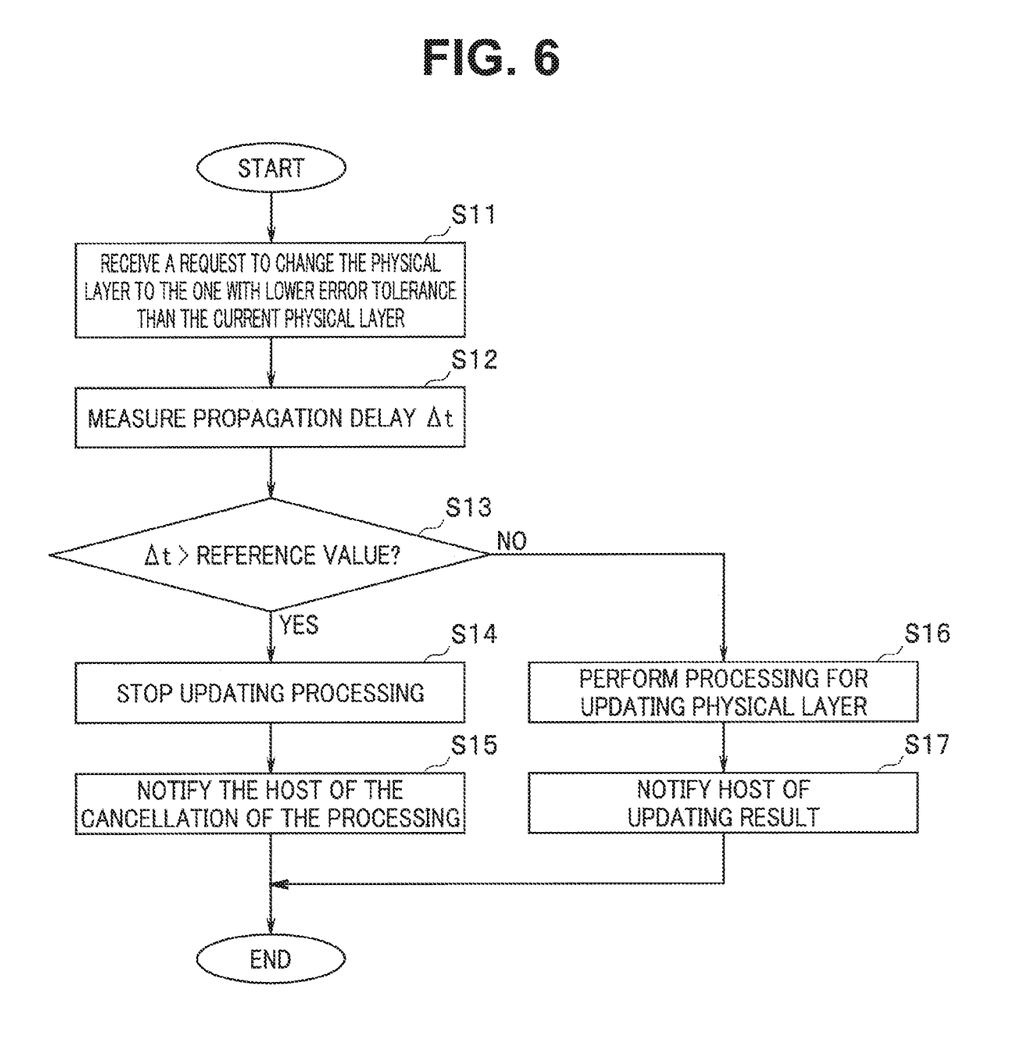
FIG. 6 is a flowchart describing processing for updating a physical layer when a request to update the physical layer has been issued by a host to the device.

FIG. 6 is a flowchart to describe the processing for updating a physical layer when a request to update the physical layer from the host has been received by the device.

When the link control layer 14 receives a request to change the physical layer 13 to that with a lower error tolerance than a current physical layer from the host 30 (S11), the link control layer 14 measures a propagation delay Δt (S12). The measurement of the propagation delay Δt is similar to that in the first embodiment. Then, the link control layer 14 judges whether the propagation delay Δt is larger than a reference value (S13) or not. If the link control layer 14 judges that the propagation delay Δt is larger than the reference value (S13: YES), the link control layer 14 stops the updating processing (S14). The link control layer 14 notifies the host 30 of the cancellation of the updating processing (S15), and terminates the processing.

On the other hand, if the link control layer 14 judges that the propagation delay Δt is less or equal to the reference value (S13: NO), the link control layer 14 performs processing for updating the physical layer 13 (S16). The link control layer 14 notifies the host 30 of an updating result (S17), and terminates the processing.

From the foregoing processing, even when the request to update the physical layer 13 is received from the host 30, the update to the physical layer 13 with a lower error tolerance than the current physical layer is not performed. Thus, a good communication quality can be held. Accordingly, in the wireless communication apparatus according to the present embodiment, even if a communication distance is large, the physical layer 13 is appropriately selected so that the connection cannot be lost, as in the first embodiment.

Third Embodiment

In a BLE standard, it is defined that a request to update the physical layer 13 within the device 10 can be issued from the host 30. However, means for the host 30 to acquire information about a current propagation delay Δt from the device 10 has not been conventionally defined in the standard. Accordingly, the host 30 issues a command to update the physical layer 13 without any information to select a physical layer 13 considering an error tolerance. Thus, if a communication distance between the devices 10 and 20 is large, the connection may be lost.

In the present embodiment, a device 10 implements a command and an event for the host 30 to read a measured value of a propagation delay Δt from the device 10. In other words, the host 30 can acquire the measured value of the propagation delay Δt at any time by using the command.

In the present embodiment, the host 30 requests information about the magnitude of the propagation delay Δt measured by the device 10 prior to requesting the update of the physical layer 13. When the host 30 issues to the device 10a. command to request a measure value of the propagation delay Δt, the device 10 returns the measured value of the propagation delay Δt as a parameter of the event to the host 30. The host 30 can get the information about the magnitude of the propagation delay Δt of the current connection between the device 10 and its peer through the event.

Figure 7:
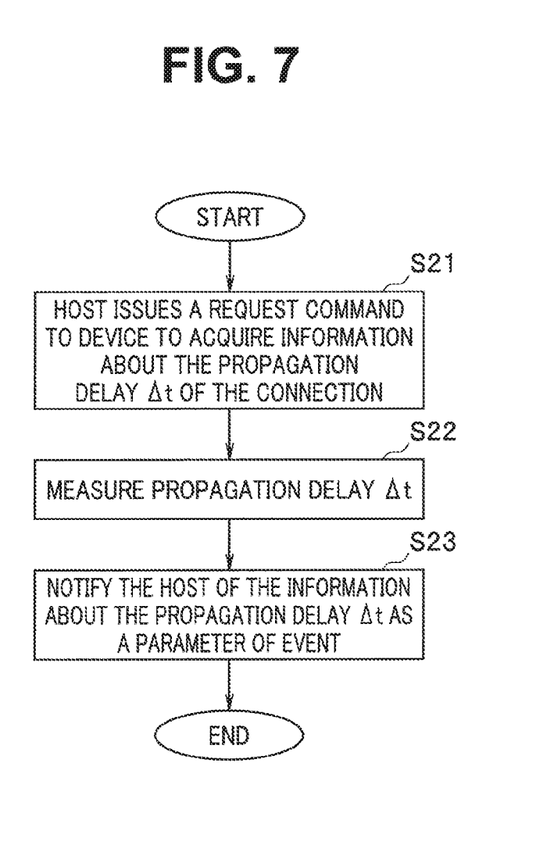
FIG. 7 is a flowchart illustrating processing performed when the device is requested to acquire information about a propagation delay from the host.

FIG. 7 is a flowchart illustrating an example of processing performed when a device 10 is requested to acquire the information about a propagation delay from a host 30.

The host 30 issues to the device 10 a command to request to acquire information about a propagation delay Δt in the physical layer 13 (S21). When the device 10 receives the command, the link control layer 14 measures the propagation delay Δt (S22). The device 10 notifies the host 30 of information about the measured propagation delay Δt as a parameter of an event (S23). If the device 10 already has a recent measured value of the propagation delay Δt within the device 10, the measurement of the propagation delay Δt by the link control layer 14 can be omitted.

From the foregoing processing, the host 30 can acquire the information about the propagation delay Δt, and can determine whether to issue a command to update the physical layer 13 to the device 10 or not depending on the information.

The host 30 compares the propagation delay Δt with a reference value, to judge whether to update the physical layer 13 or not. More specifically, the host 30 judges whether to update the physical layer 13 or not, depending on the result of the comparison between the measured propagation delay Δt and the reference value, and whether to issue a request to the device 10 to update the physical layer or not.

As a result, the host 30 can avoid to perform an update to a physical layer 13 with a low error tolerance when the devices 10 and 20 are away from each other by 1 km or more, and can prevent connection between the devices 10 and 20 from being lost.

The plurality of steps in the flowchart in the present specification may be simultaneously executed by changing an execution order or may be executed in an order that differs for each execution as long as they are not contrary to their properties. If a measured propagation delay information is already available, for example, some of the processes may be omitted in some circumstances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
   a transmission/reception circuit configured to transmit and receive a packet to and from a communication peer;
   a counter configured to start to measure a time period after an elapse of a predetermined time period from an end of the packet transmitted to the communication peer;
   a physical layer configured to detect a synchronization code included in the packet transmitted from the communication peer and generate a synchronization detection signal; and
   a register configured to acquire a measured value by the counter when receiving the synchronization detection signal; and
   a reception control circuit having a function of updating the physical layer to a physical layer with a different error tolerance and configured to calculate a propagation delay by subtracting a length of the synchronization code from the measured value and judge whether to update the physical layer or not depending on the propagation delay.

2. The wireless communication apparatus according to claim 1, wherein the reception control circuit
   compares the measured propagation delay with a reference value,
   performs control not to change a physical layer with a high error tolerance to a physical layer with a low error tolerance when the propagation delay is larger than the reference value, and
   performs control to change the physical layer with a high error tolerance to the physical layer with a low error tolerance when the propagation delay is less or equal to the reference value.

3. The wireless communication apparatus according to claim 1, wherein
   the reception control circuit judges whether to update the physical layer or not depending on the propagation delay when receiving a request command to update the physical layer from a host.

4. The wireless communication apparatus according to claim 1, wherein
   the reception control circuit, on which a command to acquire information about a propagation delay of the wireless communication and a response event corresponding to the command are implemented, returns the information about the propagation delay to the host when receiving a command to request to notify the information about the propagation delay from a host.

5. The wireless communication apparatus according to claim 4, wherein
   the reception control circuit returns the information about the propagation delay as a parameter of the response event to the host.

6. A wireless communication system including a first wireless communication apparatus and a second wireless communication apparatus to and from which packets are alternately transmitted and received, wherein
   the first wireless communication apparatus comprises
   a transmission/reception circuit configured to transmit and receive a packet to and from the second wireless communication apparatus,
   a counter configured to start to measure a time period after a predetermined time period from an end of the packet transmitted to the second wireless communication apparatus,
   a physical layer configured to detect a synchronization code included in the packet transmitted from the second wireless communication apparatus and generate a synchronization detection signal,
   a register configured to acquire a measured value by the counter when receiving the synchronization detection signal, and
   a reception control circuit having a function to update the physical layer to a physical layer with a different error tolerance and configured to calculate a propagation delay by subtracting a length of the synchronization code from the measured value and judge whether to update the physical layer or not depending on the propagation delay, and
   the first wireless communication system communicates with the second wireless communication apparatus using the physical layer designated by the reception control circuit depending on a judgment of the control unit.

\* \* \* \* \*